US00RE49536E

(19) United States
(12) Reissued Patent
Koyanagi

(10) Patent Number: US RE49,536 E
(45) Date of Reissued Patent: May 23, 2023

(54) IMAGE READING APPARATUS WITH MULTI-SHEET FEED DETECTION

(71) Applicant: SEIKO EPSON CORPORATION, Tokyo (JP)

(72) Inventor: Noriyuki Koyanagi, Fukuoka (JP)

(73) Assignee: Seiko Epson Corporation, Tokyo (JP)

(21) Appl. No.: 16/909,205

(22) Filed: Jun. 23, 2020

Related U.S. Patent Documents

Reissue of:
(64) Patent No.: 10,015,338
Issued: Jul. 3, 2018
Appl. No.: 15/334,361
Filed: Oct. 26, 2016

(30) Foreign Application Priority Data

Oct. 30, 2015 (JP) ..... 2015-213924

(51) Int. Cl.
*H04N 1/00* (2006.01)

(52) U.S. Cl.
CPC ..... *H04N 1/00779* (2013.01); *H04N 1/00* (2013.01); *H04N 1/0057* (2013.01); *H04N 1/00689* (2013.01); *H04N 1/00745* (2013.01); *H04N 2201/0081* (2013.01)

(58) Field of Classification Search
CPC .... H04N 1/00; H04N 1/0057; H04N 1/00689; H04N 1/00745; H04N 1/00779; H04N 2201/0081
See application file for complete search history.

(56) References Cited

U.S. PATENT DOCUMENTS 9,648,186 B2 * 5/2017 Motoyama ..... H04N 1/00663
2002/0057917 A1 5/2002 Deen et al.
2003/0161004 A1 8/2003 Bolanos
2003/0190169 A1 10/2003 Shibaki
2007/0058994 A1 * 3/2007 Yaguchi ..... G03G 15/607 399/17
2007/0263242 A1 * 11/2007 Takahashi ..... G06F 3/1254 358/1.14
2008/0174626 A1 * 7/2008 Hirao ..... G03G 15/6552 347/16
2011/0249290 A1 * 10/2011 Hayber ..... G06F 3/121 358/1.15
2015/0281488 A1 10/2015 Kawauchi

FOREIGN PATENT DOCUMENTS

JP 2012-041118 A 3/2012

OTHER PUBLICATIONS

Extended European Search Report for the corresponding European patent application No. 16196231.1 dated May 8, 2017.

* cited by examiner

*Primary Examiner* — Joshua D Campbell
(74) *Attorney, Agent, or Firm* — Global IP Counselors, LLP

(57) ABSTRACT

An image reading apparatus includes a transport section that can transport original documents along a transport path, a reading section configured to read images of the original documents transported by the transport section, an output controller configured to output data of the original documents read by the reading section, a multi-sheet feed detection sensor configured to detect a multi-sheet feed of the original documents transported by the transport section, and an instruction section configured to issue an instruction to disable multi-sheet feed detection by the multi-sheet feed detection section.

19 Claims, 6 Drawing Sheets

IMAGE READING APPARATUS WITH MULTI-SHEET FEED DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 10,015,338, which was filed as U.S. patent application Ser. No. 15/334,361 on Oct. 26, 2016 and issued on Jul. 3, 2018, which claims priority to Japanese Patent Application No. 2015-213924 filed on Oct. 30, 2015, the disclosure of which are incorporated herein by reference in its entirety.*

BACKGROUND

1. Technical Field

The present invention relates to an image reading apparatus such as a scanner that reads images of original documents.

2. Related Art

Typical image reading apparatuses separate a plurality of original documents mounted on an original platen (placement section) one by one, transport the original documents, and read images of the original documents (see, for example, JP-A-2012-41118).

Such image reading apparatuses include a multi-sheet feed detection sensor (multi-sheet feed detection section) for detecting whether a plurality of original documents are transported in an overlapped state (hereinafter, also referred to as a multi-sheet feed). Such image reading apparatuses have a separation mode for separating the original documents on the original platen and transporting the original documents, and a non-separation mode for manually feeding the original documents. While the non-separation mode is selected, the multi-sheet feed state detected by the multi-sheet feed detection sensor is disabled.

In other words, in the image reading apparatuses, original documents such as envelopes and center-folded original documents, which are transported one by one but may be erroneously detected as a multi-sheet feed, are manually fed one by one in the non-separation mode.

In some cases, however, image reading apparatuses have to read a plurality of original documents including original documents such as envelopes that tend to be erroneously detected as a multi-sheet feed, even if a single envelope is fed, and original documents that are rarely detected as an error such as paper. In such a case, it is laborious to feed the original documents one by one to read the original documents in the non-separation mode. On the other hand, if the original documents are read in the separation mode, the multi-sheet feed detection sensor may erroneously detect an error, and the reading operation may be stopped. In such a case, the erroneously detected original documents are to be read in the non-separation mode, and this operation causes the read data to be split into a plurality of files corresponding to before and after the detected error.

SUMMARY

An advantage of some aspects of the invention is that there is provided an image reading apparatus capable of reducing the splitting of read data into a plurality of files when original documents to be read include original documents that tend to be erroneously detected as a multi-sheet feed.

Hereinafter, an apparatus for solving the above-mentioned problem and its operational advantages will be described. An image reading apparatus that can solve the above-mentioned problem includes a transport section configured to transport original documents along a transport path, a reading section configured to read images of the original documents transported by the transport section, an output controller configured to output data of the original documents read by the reading section, a multi-sheet feed detection section configured to detect a multi-sheet feed of the original documents transported by the transport section, and an instruction section configured to issue an instruction to disable multi-sheet feed detection by the multi-sheet feed detection section. After a job for sequentially transporting a plurality of original documents to perform a reading operation to read images is interrupted by multi-sheet feed detection performed by the multi-sheet feed detection section, and if the job is restarted in a disabling mode in which the multi-sheet detection is disabled in accordance with an instruction from the instruction section, the output controller outputs, as a data stream that can be saved as a single file, first data that is read in the reading operation before the interruption and second data that is read in the reading operation after the restart.

With this structure, the output controller outputs the first data and the second data as a data stream. Accordingly, the first data read before the interruption and the second data read after the restart can be merged into a single file even if the job is interrupted by the multi-sheet feed detection. Consequently, the splitting of the read data into a plurality of files can be reduced when the original documents to be read include original documents that tend to be erroneously detected as a multi-sheet feed.

It is preferable that the image reading apparatus further include a transport detection section configured to detect the original documents transported by the transport section. The disabling mode includes an original document unit disabling mode for disabling the multi-sheet feed detection by the multi-sheet feed detection section until the trailing edges of the original documents pass through the multi-sheet feed detection section, and if the original document unit disabling mode is instructed by the instruction section, in response to detection of the passage of the trailing edges of the original documents through the multi-sheet feed detection section based on a detection signal by the transport detection section, the multi-sheet feed detection by the multi-sheet feed detection section is enabled.

With this structure, for example, to read the original documents that tend to be erroneously detected as a multi-sheet feed, the original document unit disabling mode can be selected to disable the multi-sheet feed detection by the multi-sheet feed detection section until the original documents have passed through the multi-sheet feed detection section. After the passage of the original documents, the multi-sheet feed detection can be enabled.

It is preferable that in the image reading apparatus, the disabling mode include a job unit disabling mode for disabling the multi-sheet feed detection by the multi-sheet feed detection section until the job is complete. If the job unit disabling mode is instructed by the instruction section, in response to the job completion, the multi-sheet feed detection by the multi-sheet feed detection section is enabled.

With this structure, in the job unit disabling mode, the multi-sheet feed detection can be disabled until the job is complete. Accordingly, the job interruption caused by erroneous detection can be reduced, for example, when original documents that tend to be erroneously detected as a multi-sheet feed are included in the original documents to be read in a single job. After job completion, the multi-sheet feed detection can be enabled.

It is preferable that the image reading apparatus further include a placement section on which the original documents to be read are mounted, a placement detection section configured to detect the original documents mounted on the placement section, and a transport detection section configured to detect the original documents mounted on the placement section and transported by the transport section. From the job interruption to the job restart, the disabling mode set in accordance with the instruction from the instruction section is maintained regardless of the detection results of the placement detection section and the transport detection section.

With this structure, from the job interruption to the job restart, the placement detection section and the transport detection section detect resetting of the original documents. However, from the job interruption to the job restart, regardless of the detection results of the placement detection section and the transport detection section, the disabling mode is maintained, and thereby the job can be restarted in the disabling mode after resetting the original documents.

It is preferable that in the image reading apparatus, the disabling mode include a disable maintaining mode for maintaining the state in which the multi-sheet feed detection by the multi-sheet feed detection section is disabled until the power supply is switched off. With this configuration, in the disable maintaining mode, in response to a disable instruction by the instruction section, the multi-sheet feed detection can be disabled until the power is switched off. Accordingly, the job interruption caused by erroneous detection can be reduced when performing a plurality of jobs including original documents that tend to be erroneously detected as a multi-sheet feed.

It is preferable that, in the image reading apparatus, the instruction section issue an instruction for starting the job, and the interrupted job be restarted in accordance with the start instruction from the instruction section.

With this configuration, the interrupted job can be restarted at any time by instructing the instruction section to issue an instruction to start the job.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
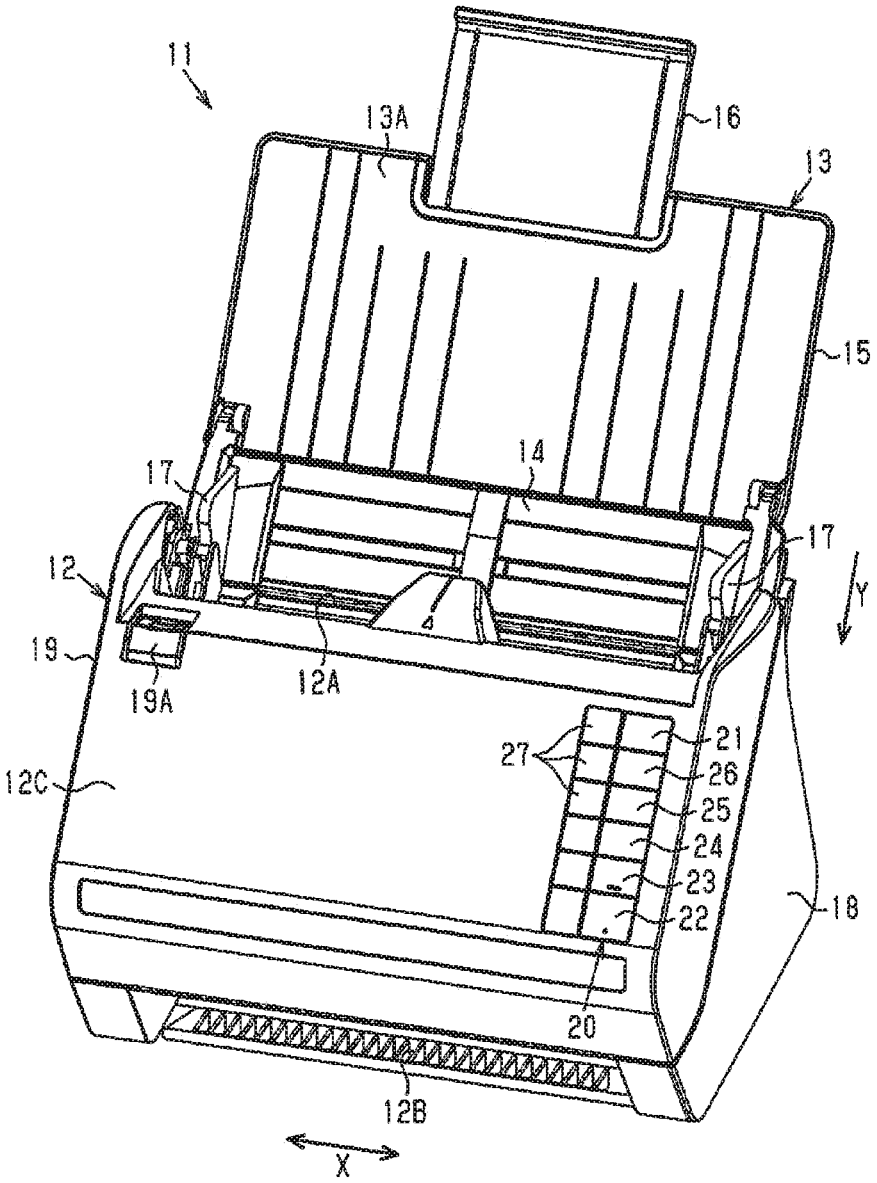
FIG. 1 is a perspective view of an image reading apparatus according to an embodiment.

Hereinafter, an image reading apparatus according to an embodiment will be described with reference to the attached drawings. As illustrated in FIG. 1, an image reading apparatus 11 according to the embodiment includes an apparatus body 12 (hereinafter, simply referred to as "body 12") that has a substantially trapezoidal shape in side view, and an original support 13 that is an example placement section having a mounting surface 13A onto which original documents D (see FIG. 2) that are to be read are mounted (set). The original documents D mounted on the original support 13 are fed one by one to a feed port 12A that is open to an upper portion of the body 12. The fed original documents D are transported in the body 12 along a predetermined transport path 32 (see FIG. 2), and the images of the original documents are read at a reading position on the transport path. The original documents are then discharged from a discharge port 12B that is open to a front lower portion of the body 12 and stacked, for example, on a discharge tray 18A (see FIG. 2).

The original support 13 includes a first support section 14 that is rotatably connected to the body 12 at a base end portion (lower end portion), and a second support section 15 that is rotatably connected to an end portion of the first support section 14 at a base end portion. A slidable auxiliary support section 16 is provided at an end portion of the second support section 15. The original support 13 extends upward in an inclined manner from the rear of the body 12 and can be arranged in an open position (use position) where the original support 13 serves as a support on which the original documents D can be mounted, as illustrated in FIG. 1, or in a closed position (stored position) where the original support 13 can be adjusted by a user to cover an upper surface portion and a front surface portion 12C of the body 12 by turning the original support 13 from the open position toward the paper surface in FIG. 1.

A pair of edge guides 17 that can be slid in width directions X which intersect (specifically, are orthogonal to) a transport direction Y in which the original documents D are transported are provided on the mounting surface 13A of the original support 13. The original documents D mounted on the mounting surface 13A are held by the pair of edge guides 17, and thereby the original documents D are positioned in the width direction X with respect to the feed port 12A. Note that the width direction X is a main scanning direction along which the image reading apparatus 11 reads images of the original documents D, and the transport direction Y is a sub-scanning direction.

Figure 2:
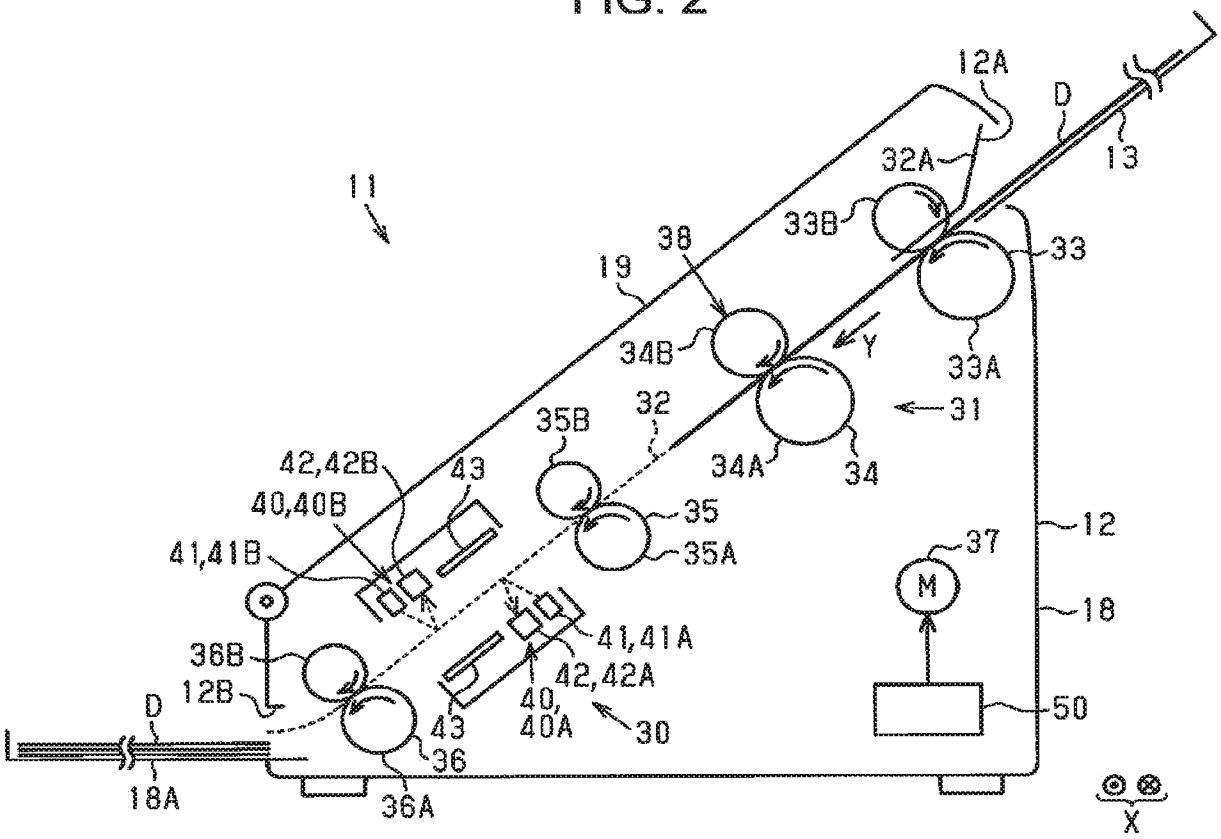
FIG. 2 is a schematic side cross-sectional view of the image reading apparatus.

As illustrated in FIG. 1 and FIG. 2, the body 12 includes a body section 18 and a cover section 19 that is connected to the body section 18 such that the cover section 19 can rotate about a front end portion of the body section 18. A transport path 32 from the feed port 12A to the discharge port 12B is provided between the body section 18 and the cover section 19 as illustrated in FIG. 2 when the cover section 19 is arranged in the closed position illustrated in FIG. 1 and FIG. 2. A transport surface section 39 (see FIG. 3) that is a surface section of the transport path 32 is exposed when a user operates the operation section 19A illustrated in FIG. 1 to release the engagement of the cover section 19 and rotates the cover section 19 from the closed position illustrated in FIG. 1 toward the paper surface illustrated in FIG.

1 and to the open position. By opening the cover section 19 and exposing the transport surface section 39, the user can, for example, remove lodged (jammed) original documents D and perform maintenance of rollers 33A to 36A for feeding and transporting original documents (see FIG. 2).

An instruction section 20 for issuing an instruction for starting a job, an instruction for disabling multi-sheet feed detection, or the like is provided on the front surface portion 12C of the body 12 (cover section 19), as illustrated in FIG. 1. The term "multi-sheet feed" refers to a state in which a plurality of original documents D mounted on the original support 13 are transported in an overlapped state. The instruction section 20 includes a plurality of switches 21 to 26 for issuing instructions to the image reading apparatus 11. Specifically, the instruction section 20 includes various switches such as a power switch 21, a start switch 22, a stop switch 23, a read mode selection switch 24, a multi-sheet feed detection disabling switch 25 (multi-sheet feed detection skip switch), and a wireless communication switch 26.

The power switch 21 is operated by a user to issue an instruction for switching between starting power supply to the image reading apparatus 11 and stopping the power supply. The start switch 22 is used to issue an instruction to start a job for transporting at least one, for example, a plurality of original documents D mounted on the original support 13 in sequence and performing a reading operation for reading images. The stop switch 23 is used to issue a stop instruction for interrupting or stopping the job started by the operation of the start switch 22. The read mode selection switch 24 is used to issue an instruction for specifying an image reading mode for reading images in a reading operation, for example, a color mode (e.g., monochrome or color) or image quality.

The multi-sheet feed detection disabling switch 25 is operated by a user to issue an instruction for disabling multi-sheet feed detection to switch to a disabling mode for disabling multi-sheet feed detection for detecting whether a multi-sheet feed has occurred. The wireless communication switch 26 is used to issue an instruction for switching wireless communication on and off.

At a position adjoining to the instruction section 20, a notification section 27 that includes pilot lamps that can light up and/or blink and go out, for example, light-emitting diodes (LEDs), or pilot lamps that can change colors when lit, is provided. The notification section 27 is used to notify a user of, for example, whether the power supply is turned on or off, a currently selected mode, or whether multi-sheet feed detection is enabled or disabled by turning on or off the pilot lamps or by changing their colors.

An image reading processing mechanism 30 for image reading processing (scan processing) is provided in the body 12 of the image reading apparatus 11, as illustrated in FIG. 2. The image reading processing mechanism 30 includes a transport section 31 that transports the original documents D. The transport section 31 guides and transports a plurality of original documents D mounted on the original support 13 one by one from the feed port 12A along a plate-like feed guide 32A into the body 12 and transports the fed original documents D along the transport path 32 at a constant transport speed.

The transport section 31 includes a feeding roller pair 33 that is disposed at an upstream end position of the transport path 32 in the body 12, and a feeding roller pair 34 that is disposed downstream of the feeding roller pair 33 in the transport direction. The transport section 31 further includes a transport roller pair 35 that is disposed upstream of the reading position of the original documents D and a transport roller pair 36 that is disposed downstream of the reading position in the transport direction Y.

The feeding roller pairs 33 and 34 include driving rollers 33A and 34A and driven rollers 33B and 34B. The transport roller pairs 35 and 36 include driving rollers 35A and 36A and driven rollers 35B and 36B. The driven rollers 33B to 36B rotate in response to the rotation of corresponding driving rollers 33A to 36A respectively.

The driving rollers 33A to 36A of the roller pairs 33 to 36 are rotated and driven by the power of a transporting motor 37 that is the power source of the rollers. The driven rollers 34B of the feeding roller pair 34 serve as retard rollers, and the coefficients of friction against the original documents D on their outer circumferential surfaces are larger than those of the driving rollers 34A. Accordingly, the feeding roller pair 34 serves as a separation mechanism 38 that separates the original documents D one by one and sends the separated original documents to the downstream side in the transport direction Y. That is, a plurality of original documents D mounted on the original support 13 are fed, for example, from the lowest original in sequence one by one from the feed port 12A into the body 12 by the rotation of the feeding roller pair 33 and are further separated one by one and fed to the downstream side in the transport direction Y by the rotation of the feeding roller pair 34.

As illustrated in 2, a reading section 40 that reads images of the original documents D transported by the transport section 31 is provided at the reading position in the middle of the transport path 32 that is defined by the feeding roller pairs 33 and 34 and the transport roller pairs 35 and 36 in the body 12. The reading section 40 includes a first reading section 40A and a second reading section 40B that are disposed on both sides of the transport path 32 at positions slightly shifted in the transport direction Y such that the sections 40A and 40B do not directly face each other. The pair of reading sections 40 includes a light source 41 that can emit light toward the original document D being transported and an image sensor 42 that extends in the main scanning direction (width direction X). In a normal reading mode for reading one side (front surface) of the original document D, the first reading section 40A performs a reading operation, and in a two-sided reading mode for reading both sides (front and rear surfaces) of the original document D, the first reading section 40A and the second reading section 40B perform a reading operation together.

The light source 41 may be, for example, an LED or a fluorescent lamp. The image sensor 42 receives the light emitted from the light source 41 and reflected by the original documents D, or the like, converts the received light into electrical signals, and outputs pixel signals of values corresponding to the amounts of received light. The image sensor 42 may be, for example, a linear image sensor. The image reading apparatus 11 can perform color scanning and monochrome scanning (gray-scale scanning). The color scanning includes a method in which light sources of RGB emit light in a time-series order and pixel signals of RGB are acquired from a monochrome image sensor in this order, and a method in which an image sensor that includes photoelectric converters covered with respective RGB color filters is provided, a white light source emits light, and pixel signals of RGB are acquired from the photoelectric converters. Any one of the color scanning methods may be employed. In the description below, the light source 41 and the image sensor 42 may be referred to as components of the first reading section 40A, a first light source 41A, and a first image sensor 42A, respectively and as components of the second reading section 40B, a second light source 41B, and the second image sensor 42B, respectively.

A color reference plate 43 is disposed on the opposite side of the transport path 32 to the image sensor 42. The color reference plate 43 is used to obtain a white reference value for shading correction, and a white reference plate or gray reference plate is used. The gray reference plate is used to detect the position and area of the original document D from data read by using the color reference plate 43 as a background (gray background) of the original, based on a difference between the colors or luminance values of the original and the background. It is preferable that the white reference plate be used as the color reference plate 43 when detecting an original by using a sensor dedicated for original detection.

The image sensor 42 may be, for example, a contact type image sensor that has a plurality of photoelectric converters aligned in the main scanning direction (width direction X). More specifically, the image sensor 42 may be a complementary metal oxide semiconductor (CMOS). The image sensor 42 performs photoelectric conversion of the light received by each photoelectric converter and outputs pixel signals corresponding to the amounts of received light.

A controller 50 provided in the body 12 controls the transporting motor 37, the light source 41 and the image sensor 42 included in the reading section 40 (40A and 40B). The controller 50 further controls the image reading apparatus 11 in accordance with instructions given by operation signals from the instruction section 20 operated by a user.

The transport surface section 39 that is a surface section of a lower side of the transport path 32 for the original documents D is described with reference to FIG. 3. The transport surface section 39 that is defined by an upper surface of the body section 18 includes a transport plate 18B that covers the upper surface of the body section 18 and a plurality of ribs 18C that protrude from the upper surface and extend in parallel with each other along the transport direction Y. In a substantially central portion of the transport surface section 39 in the width direction X, the driving rollers 33A and 34A included in the feeding roller pairs 33 and 34, and the driving rollers 35A and 36A included in the transport roller pairs 35 and 36 are disposed respectively as pairs with a certain space in the width direction X in this order from the upstream side in the transport direction Y. A placement sensor 45, which is an example placement detection section for detecting the original documents D mounted on the original support 13, is disposed between the pair of driving rollers 33A included in the feeding roller pair 33. The placement sensor 45 is, for example, a contact sensor having a lever, and detects whether the original documents D mounted on the original support 13 exist in response to a pressing operation of the lever.

Figure 3:
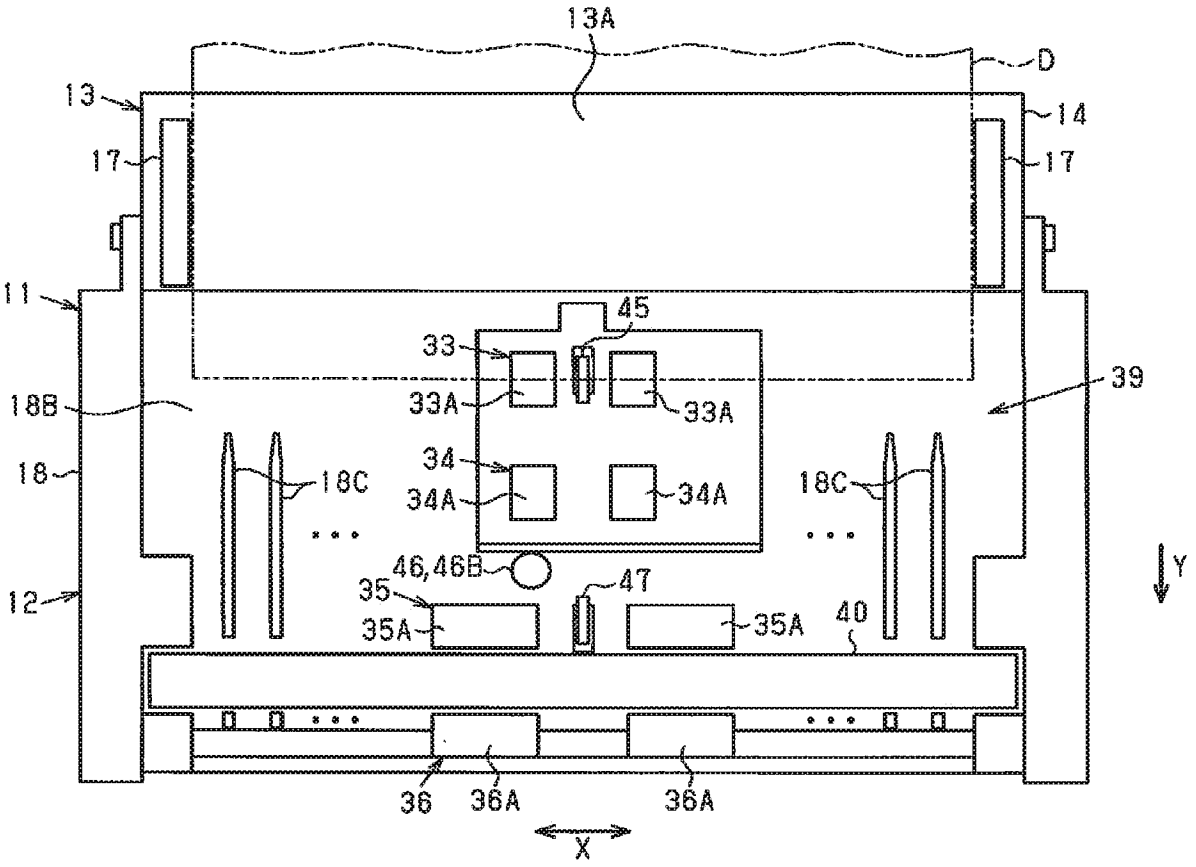
FIG. 3 is a schematic plan view of a transport surface section of a body section.
Figure 4:
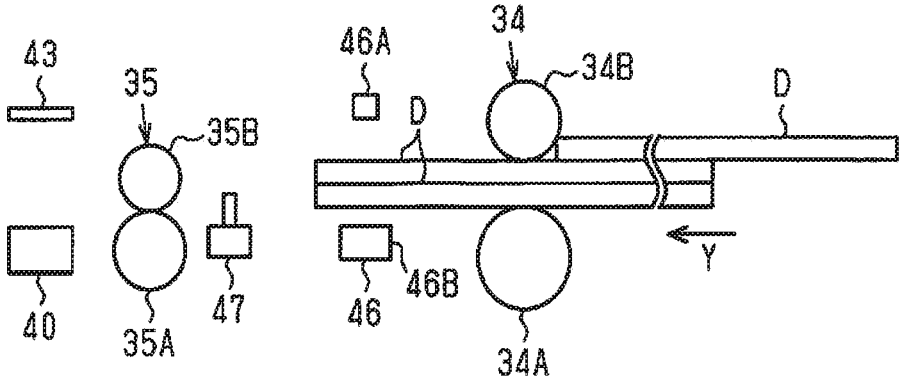
FIG. 4 is a schematic side view of overlapped original documents detected by a multi-sheet feed sensor.

A multi-sheet feed sensor 46, which is an example multi-sheet feed detection section for detecting a multi-sheet feed of the original documents D transported by the transport section 31, is disposed between the feeding roller pair 34 and the transport roller pair 35 in the transport direction Y, as illustrated in FIG. 3 and FIG. 4. The multi-sheet feed sensor 46 is, for example, an ultrasonic sensor, and includes a transmitter 46A (see FIG. 4) that can transmit ultrasound and a receiver 46B that is disposed on the opposite side of the transport path 32 from the transmitter 46A and can receive the ultrasound from the transmitter 46A. The multi-sheet feed sensor 46 detects a multi-sheet feed of the original documents D using the principle that ultrasound from the transmitter 46A is attenuated due to spaces between overlapped two original documents. The degree of attenuation of the ultrasound passed through two or more original documents D is larger than that of the ultrasound passed through one original document D. Accordingly, if a detected value exceeds (is below) a predetermined threshold value due to the large degree of attenuation, it is determined to be a multi-sheet feed. In contrast, since the degree of attenuation of the ultrasound passed through one original document D is small, the detected value does not exceed the predetermined threshold value, and it is not determined to be a multi-sheet feed.

Accordingly, if the original document D that has an overlapped portion, for example, an envelope or folded paper is used, since the degree of attenuation of the ultrasound due to the spaces in the overlapped portion is large, the multi-sheet feed sensor 46 may erroneously determine the one original document D being transported to be a multi-sheet feed. Accordingly, to read the original document D that tends to be erroneously determined to be a multi-sheet feed, the user can operate the multi-sheet feed detection disabling switch 25 to issue an instruction for disabling the multi-sheet feed detection by the multi-sheet feed sensor 46 to set a disabling mode that disables the multi-sheet feed detection.

Furthermore, a transport sensor 47, which is an example transport detection section for detecting the original documents D mounted on the original support 13 and transported by the transport section 31, is disposed between the pair of driving rollers 35A included in the transport roller pair 35. The transport sensor 47 is, for example, a contact sensor having a lever (contactor), and detects the leading edge when the leading edge of the original document D pushes the lever and a non-detection state (off) is switched to a detection state (on), and detects the trailing edge when the trailing edge passes through the lever and the lever is not pushed and the detection state is switched to the non-detection state. The detection result of the transport sensor 47 is used to control the time of starting and ending the reading operation of the reading section 40 (40A, and 40B) that is disposed downstream in the transport direction Y.

Figure 5:
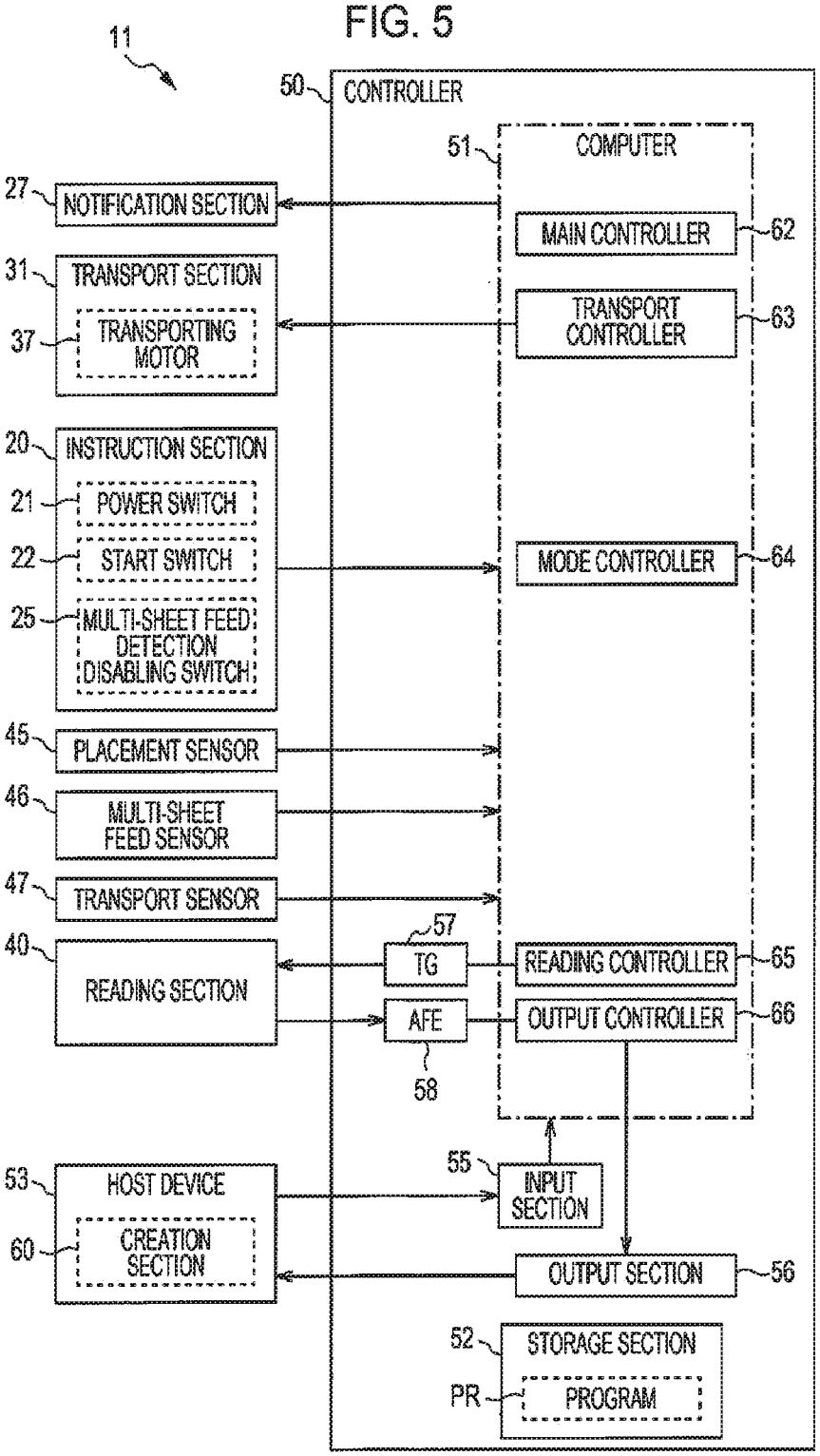
FIG. 5 is a block diagram illustrating an electrical configuration and a functional configuration of the image reading apparatus.

With reference to FIG. 5, an electrical configuration of the image reading apparatus 11 is described. As illustrated in FIG. 5, the controller 50 includes a computer 51 that has a microprocessor, and the like, and a storage section 52. The controller 50 further includes an input section 55 that has an input interface for inputting various kinds of data and signals from a host device 53, and an output section 56 that has an output interface for outputting data read by the image reading apparatus 11 to the host device 53.

The controller 50 further includes a timing generator (TG) 57 for outputting pulse signals defining the time of various operations including an operation of reading a pixel signal for the reading section 40 (image sensors 42A and 42B). The controller 50 also includes an analog front end (AFE) 58 that performs analog-to-digital conversion (A/D conversion) of pixel signals input from the image sensors 42A and 42B. The storage section 52 includes, for example, a nonvolatile memory and a random access memory (RAM).

The image reading apparatus 11 is connected to the host device 53 via a communication cable. The host device 53 may be, for example, a personal computer (PC). It should be noted that the host device 53 is not limited to the PC, and may be a personal digital assistant (PDA), a tablet PC, or a smart device such as a smart phone. The host device 53 includes a creation section 60 that creates a file based on data output from the image reading apparatus 11.

Figure 6:
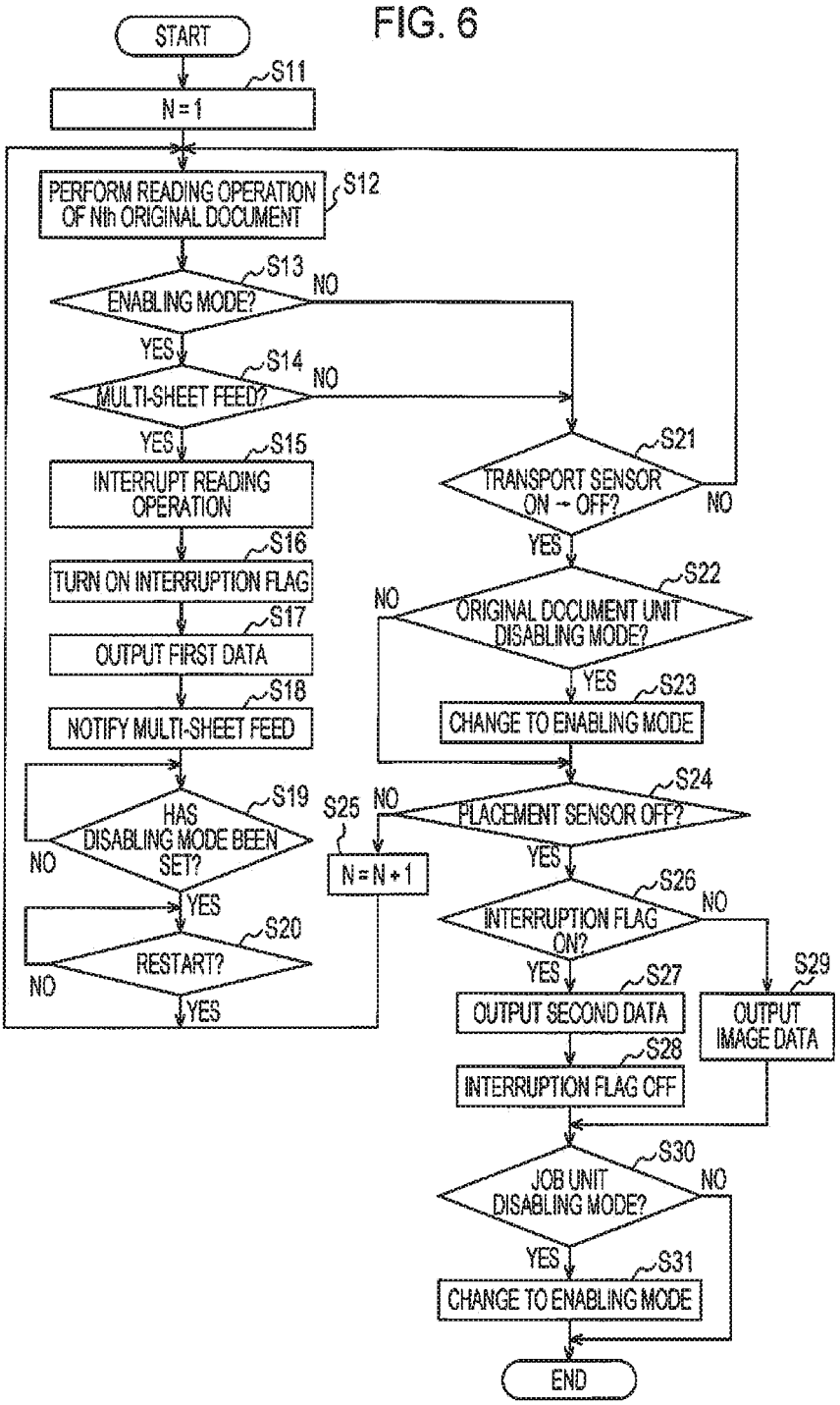
FIG. 6 is a flowchart illustrating multi-sheet feed detection disabling processing.

The storage section 52 in FIG. 5 stores a program (PR) and the like that includes a program for multi-sheet feed detection disabling processing illustrated in the flowchart in FIG. 6. The computer 51 in FIG. 5 serves as a functional section of various functions illustrated in FIG. 5 by executing the program PR. That is, as illustrated in FIG. 5, the computer 51 includes, as the functional section, a main controller 62, a transport controller 63 for controlling the transporting motor 37, a mode controller 64, a reading controller 65 for controlling the reading section 40, and an output controller 66 for controlling output of data of the original documents D read by the reading section 40.

The transport controller 63 drives the transporting motor 37 in accordance with an instruction from the main controller 62 to rotate the roller pairs 33 to 36 such that the original documents D mounted on the original support 13 is fed into the body 12 one by one. The transport controller 63 further transports the fed original documents D along the transport path 32 at a constant transport speed corresponding to the read conditions.

The mode controller 64 switches an enabling mode for enabling the multi-sheet feed detection by the multi-sheet feed sensor 46 and a disabling mode for disabling the multi-sheet feed detection in accordance with an instruction from the multi-sheet feed detection disabling switch 25. The disabling mode according to the embodiment includes an original document unit disabling mode, a job unit disabling mode, and a disable maintaining mode, which control different time periods for maintaining a disabled state, respectively. These disabling modes are set, for example, depending on an operation of the multi-sheet feed detection disabling switch 25.

In the original document unit disabling mode, multi-sheet feed detection by the multi-sheet feed sensor 46 is disabled until the trailing edges of the original documents D pass through the multi-sheet feed sensor 46. The original document unit disabling mode is set when a user performs a first operation (for example, presses the multi-sheet feed detection disabling switch 25 once) and a first instruction is issued.

In the job unit disabling mode, the multi-sheet feed detection by the multi-sheet feed sensor 46 is disabled until the job ends. The job unit disabling mode is set when a user performs a second operation (for example, presses the multi-sheet feed detection disabling switch 25 twice) and a second instruction is issued.

In the disable maintaining mode, the multi-sheet feed detection by the multi-sheet feed sensor 46 is disabled until the power supply is switched off. The disable maintaining mode is set when a user performs a third operation (for example, presses long the multi-sheet feed disabling switch 25) and a first instruction is issued.

The enabling mode is set when any of the first to third operations is not performed or a reset operation (for example, the stop switch 23 is pressed once while a reading operation is interrupted) is performed.

The reading controller 65 controls the reading section 40 while the original documents D are being transported to read images of the original documents D. Specifically, the reading controller 65 outputs pulse signals to the image sensor 42 via the TG 64 to control reading time for reading pixel signals and thereby the reading operations are controlled. The analog pixel signals output from the reading section 40 are converted into digital pixel signals via the AFE 58 and input into the output controller 66 as read data.

The output controller 66 performs known image correction processing such as shading correction and gamma correction to the read data containing the input digital pixel signals to generate image data of the original documents D. Then, the output controller 66 outputs the generated image data to the host device 53 via the output section 56.

Hereinafter, the multi-sheet feed detection disabling processing to be executed by the computer 51 is described with reference to the flowchart in FIG. 6. The computer 51 starts a job for performing a reading operation of the original documents D and performs multi-sheet feed detection disabling processing in response to an operation of the start switch 22 while the original documents D are mounted on the original support 13. In this embodiment, a single job includes transporting the original documents D mounted on the original support 13 one by one from the first original, causing the reading section 40 to read images, and reading an image on the last original document D.

In step S11, the computer 51 initializes the value of N corresponding to the pages of the original documents D to one. In step S12, the computer 51 performs an operation for reading an Nth original document D. Specifically, the transport controller 63 drives the transporting motor 37 to feed and transport the original documents D mounted on the original support 13, and the reading controller 65 instructs the reading section 40 to read images of the original documents D at the time the original documents D pass through the reading position.

In step S13, the computer 51 determines whether the enabling mode for enabling the multi-sheet feed detection has been set. If the enabling mode has been set (step S13: YES), in step S14, the computer 51 determines whether a multi-sheet feed has occurred. For example, when the original documents D are envelopes, the multi-sheet feed sensor 46 may be turned on while the envelopes are transported one by one, and the multi-sheet feed sensor 46 may erroneously determine that a multi-sheet feed has occurred (step S14: YES).

In step S15, the computer 51 interrupts the reading operation. Specifically, the transport controller 63 stops the driving of the transporting motor 37, and the reading controller 65 stops the reading of the images of the original documents D by the reading section 40. Furthermore, in step S16, the computer 51 turns on an interruption flag, and in step S17, outputs first data. Specifically, the output controller 66 outputs the image data of the original documents D (Nth to first original documents) read before the job interruption as the first data.

In step S18, the computer 51 notifies the user of the detection of a multi-sheet feed. In step S19, the computer 51 determines whether the disabling mode for disabling the multi-sheet feed detection has been set. While the disabling mode has not been set (step S19: NO), the computer 51 stands by until the disabling mode is set. In response to an operation of the multi-sheet feed detection disabling switch 25 by the user, the mode controller 64 sets the disabling mode corresponding to the instruction. If the disabling mode has been set (step S19: YES), in step S20, the computer 51 determines whether a restart instruction has been issued. Specifically, while the start switch 22 is not pressed by the user (step S20: NO), the computer 51 stands by until the start switch 22 is pressed. If the start switch 22 is pressed, the computer 51 moves to the processing in step S12, and restarts the interrupted reading operation of the Nth original document D.

In step S13, if the disabling mode has been set (step S13: NO), the computer 51 moves to the processing in step S21. In step S14, if the multi-sheet feed sensor 46 has not detected a multi-sheet feed (off) (step S14: NO), the computer 51 moves to the processing in step S21.

In step S21, the computer 51 determines whether the transport sensor 47 is switched from on to off. That is, the transport sensor 47 is switched from off to on when the leading edge of the original document D is transported to the transport sensor 47. While the original documents D are passing through the transport sensor 47 (step S21: NO), the computer 51 moves the processing to step S12. If the trailing edge of the original document D passes through the transport sensor 47 and the transport sensor 47 is switched from on to off (step S21: YES), in step S22, the computer 51 determines whether the original document unit disabling mode has been set.

If the original document unit disabling mode has been set (step S22: YES), in step S23, the mode controller 64 changes the original document unit disabling mode to the enabling mode. If the mode that has been set is not the original document unit disabling mode (step S22: NO), in step S24, while the mode is maintained, the computer 51 determines whether the placement sensor 45 is off.

Specifically, if the original documents D are mounted on the original support 13 and the placement sensor 45 is on (step S24: NO), in step S25, the computer 51 adds one to N, and moves to step S12 to perform the reading operation of the next original document D.

If all of the original documents D that have been mounted on the original support 13 are fed and the placement sensor 45 is off (step S24: YES), in step S26, the computer 51 determines whether the interruption flag is on.

If the interruption flag is on (step S26: YES), in step S27, the computer 51 outputs the second data. That is, the output controller 66 outputs the image data read in the reading operation performed after the interruption as the second data that can be merged with the first data output in step S17 into a single file as a data stream. In step S28, the computer 51 turns off the interruption flag.

In step S26, if the interruption flag is off (step S26: NO), in step S29, the computer 51 outputs the image data. That is, since the job is not interrupted, the output controller 66 outputs the image data of all original documents D from the original document read first to the original document read last.

In step S30, the computer 51 determines whether the job unit disabling mode has been set. If the job unit disabling mode has been set (step S30: YES), in step S31, the mode controller 64 changes the job unit disabling mode to the enabling mode, and ends the processing. If the job unit disabling mode has not been set (stop S30: NO), the mode controller 64 maintains the settings, and ends the processing.

Now, the operation of reading targets including original documents D that tend to be erroneously detected as a multi-sheet feed such as envelopes and folded paper will be described. It is assumed that, for example, three original documents D have been mounted on the original support 13, and in a single job, an operation for reading all (three) original documents D mounted on the original support 13 is performed.

When the power of the image reading apparatus 11 is turned on and the start switch 22 is pressed, in the enabling mode that enables the multi-sheet feed detection, the computer 51 feeds and transports the original documents D and instructs the reading section 40 to read the original documents D.

Then, for example, if the second original document D is an envelope, the multi-sheet feed sensor 46 detects a multi-sheet feed, and interrupts the job. That is, the computer 51 completes the reading operation of the first original document D, stops the transport of the second original document D, and outputs the first data that is the data of the first original document D read in the reading operation performed before the interruption. Then, the computer 51 displays a message that prompts the user to reset the second and subsequent original documents D onto the original support 13, and a message that prompts the user to set the multi-sheet feed detection mode on a display section (not illustrated) of the image reading apparatus 11 or the host device 53, or notifies the content by voice, or the like.

From the job interruption to the job restart, the disabling mode that is set in accordance with an instruction from the instruction section 20 is maintained regardless of the detection results from the placement sensor 45 and the transport sensor 47. The interrupted job is restarted in accordance with a start instruction from the instruction section 20.

After the disabling mode is set and the start switch 22 is pressed, the computer 51 restarts the job in the disabling mode in which the multi-sheet feed detection is disabled according to the instruction from the instruction section 20, and performs the operation for reading the second and subsequent original documents D, which have been reset. That is, the interrupted job is restarted in accordance with the start instruction from the instruction section 20. Then, the original document D that was erroneously detected as a multi-sheet feed before the interruption is transported and read in the state the multi-sheet feed detection is disabled.

While the original document unit disabling mode is set in accordance with an instruction from the instruction section 20, if the computer 51 detects that the trailing edge of the second original document D has passed through the multi-sheet feed sensor 46 based on a detection signal from the transport sensor 47, the computer 51 enables the multi-sheet feed detection by the multi-sheet feed sensor 46. That is, since the transport sensor 47 is disposed downstream of the multi-sheet feed sensor 46 in the transport direction Y, the original document D has already passed through the multi-sheet feed sensor 46 when the original document D passes through the transport sensor 47. Accordingly, the computer 51 switches to the enabling mode when the transport sensor 47 is switched from on to off. When the job unit disabling mode or the disable maintaining mode has been set, the set mode is maintained.

While the job unit disabling mode is set in accordance with an instruction by the instruction section 20, when the last (for example, the third) original document D has passed through the transport sensor 47 and the job is complete, the mode controller 64 enables the multi-sheet feed detection by the multi-sheet feed sensor 46. Then, the output controller 66 outputs the second data of the second and third original documents D read in the reading operation performed after the restart as data that can be merged with the first data into a single file as a data stream. If the disable maintaining mode has been set, the computer 51 maintains the disabling mode until the power is switched off.

The host device 53 that has acquired the first data output from the image reading apparatus 11 stands by until the second data is output. The second data is output from the image reading apparatus 11, and then, in the host device 53, the creation section 60 merges the first data and the second data into a single According to the above-described embodiment, the following advantages can be achieved.

1. Time output controller 66 outputs the first data and the second data as a data stream. Accordingly, the first data read before the interruption, and the second data read after the restart, can be merged into a single file even if the job is interrupted by the multi-sheet feed detection. Accordingly, the splitting of the read data into a plurality of files can be reduced when the original documents D to be read include the original documents D that tend to be erroneously detected as a multi-sheet feed.

2. For example, to read the original documents D that tend to be erroneously detected as a multi-sheet feed, the original document unit disabling mode can be selected to disable the multi-sheet feed detection by the multi-sheet feed sensor 46 until the original documents D have passed through the multi-sheet feed sensor 46. After the passage of the original documents D, the multi-sheet feed detection can be enabled.

3. In the job unit disabling mode, the multi-sheet feed detection can be disabled until the job is complete. Accordingly, the job interruption due to erroneous detection can be reduced, for example, when the original documents D that tend to be erroneously detected as a multi-sheet feed are included in the original documents D to be read in a single job. After the job is complete, the multi-sheet feed detection can be enabled.

4. From the job interruption to the job restart, when the original documents D are reset, the placement sensor 45 and the transport sensor 47 detect the resetting of the original documents D. However, from the job interruption to the job restart, regardless of the detection results of the placement sensor 45 and the transport sensor 47, the disabling mode is maintained, and thereby the job can be restarted in the disabling mode after resetting of the original documents D.

5. In the disable maintaining mode, in response to a disable instruction from the instruction section 20, the multi-sheet feed detection is disabled until the power is switched off. Accordingly, the job interruption caused by erroneous detection can be reduced when performing a plurality of jobs including original documents D that tend to be erroneously detected as a multi-sheet feed.

6. The interrupted job can be restarted at any time by instructing the instruction section 20 to issue an instruction to start the job. The above-described embodiment can be modified as described below.

In the above embodiment, the placement sensor 45 and the transport sensor 47 may be non-contact sensors, for example, photoelectronic sensors. In the above-described embodiment, the multi-sheet feed sensor 46 may be a sensor that detects a multi-sheet feed based on the thickness of the original documents B.

In the above-described embodiment, the output controller 66 may output the first data and the second data after the job is complete. In the above-described embodiment, the creation section 60 may be provided in the image reading apparatus 11. That is, for example, the output controller 66 may output the first data and the second data to the creation section provided in the image reading apparatus 11, and the output section 56 may output the file created by the creation section to the host device 53.

In the above-described embodiment, when the job is interrupted, the reading operation may be restarted by transporting the original documents D that have been erroneously detected as a multi-sheet feed as it is without resetting the original documents D onto the original support 13.

In the above-described embodiment, the next original document D may be transported before the reading operation of the preceding original document D is complete. In the above-described embodiment, the pattern of the notification section 27 may be changed for the individual mode selected from the disabling modes. For example, the notification section 27 may light one of LEDs of different colors corresponding to the original document unit disabling mode, the job unit disabling mode, and the disable maintaining mode, respectively.

In the above-described embodiment, the start switch 22 for issuing a job start instruction may be omitted from the instruction section 20. For example, the computer 51 may start the job in accordance with a start instruction input from the host device 53. Furthermore, the computer 51 may restart the interrupted job in response to an instruction of the disabling mode from the multi-sheet feed detection disabling switch 25.

In the above-described embodiment, in a case where the disable maintaining mode is set, the disabling mode may be switched to the enabling mode and then the power of the image reading apparatus 11 may be switched off in turning off (shutting off the power supply) the power in accordance with an instruction from the power switch 21. Furthermore, in turning on the power of the image reading apparatus 11, the disabling mode may be switched to the enabling mode. Furthermore, the disable maintaining mode may be continued after the power is turned off and further the power is turned on.

In the above-described embodiment, the disabling mode and the enabling mode may be switched in accordance with an instruction from the instruction section 20. For example, the computer 51 may set the disabling mode when the multi-sheet feed detection disabling switch 25 is pressed once, and set the enabling mode when the multi-sheet feed detection disabling switch 25 is pressed again. That is, it is not always necessary that the disabling mode includes the original document unit disabling mode, the job unit disabling mode, and the disable maintaining mode. The disabling mode may include at least one of the original document unit disabling mode, the job unit disabling mode, and the disable maintaining mode.

In the above-described embodiment, the original support 13 and the placement sensor 45 may be omitted. For example, a user may insert the original documents D into the feed port 12A. Furthermore, a job may be ended after the number of original documents D to be read in the job is input via the instruction section 20 or the host device 53, and the reading operation of the original documents D of the specified number is complete. Furthermore, a job end may be instructed from the instruction section 20 (for example, by pressing the stop switch 23, or the like by the user).

In the above-described embodiment, while the job is interrupted, the multi-sheet feed detection modes may be changed in accordance with the detection results of the placement sensor 45 and the transport sensor 47. For example, based on the detection results of the placement sensor 45 and the transport sensor 47, whether the original documents D, which have been detected as a multi-sheet feed, are reset onto the original support 13 can be determined. Consequently, for example, after the multi-sheet feed sensor 46 detects a multi-sheet feed and the job is interrupted, if the job is restarted without resetting the original documents D onto the original support 13, the enabling mode may be changed to the disabling mode (for example, the original document unit disabling mode) and then the reading operation may be performed.

In the above-described embodiment, the transport sensor 47 may be omitted. For example, passage of the trailing edges of the original documents D through the multi-sheet feed sensor 46 may be detected based on the number of the original documents D fed and transported, or the read image data.

In the above-described embodiment, the instruction section 20 may be a touch panel. Furthermore, the multi-sheet feed detection disabling switch 25 is not limited to the push switch, and alternatively, a lever switch, a slide switch, or a mode switch may be employed.

The original documents may be any kind of original documents as long as they can be fed and transported by the transport section 31, for example, single sheets of paper, envelopes, cards, business cards, receipts, credit cards, insurance policies, or the like. The image reading apparatus is not limited to the sheet-feed type image reading apparatus, and alternatively, may be a flat-bed type image reading apparatus having an automatic document feeding function (automatic document feeder) as an example transport section.

The entire disclosure of Japanese Patent Application No. 2015-213924, filed Oct. 30, 2015 is expressly incorporated by reference herein.

What is claimed is:

1. An image reading apparatus comprising:

a transport section including a roller configured to transport original documents along a transport path;

a reading section including a sensor configured to read images of the original documents transported by the transport section;

an output controller configured to output data of the original documents read by the reading section;

a multi-sheet feed detection sensor configured to detect a multi-sheet feed of the original documents transported by the transport section;

an instruction section including a switch configured to issue an instruction to disable multi-sheet feed detection by the multi-sheet feed detection sensor; and a transport detection sensor configured to detect the original documents transported by the transport section, wherein, after a job for sequentially transporting a plurality of original documents to perform a reading operation to read images is interrupted by multi-sheet feed detection performed by the multi-sheet feed detection sensor, the output controller determines whether a disabling mode in which the multi-sheet *feed* detection is disabled in accordance with an instruction from the instruction section has been set or not, when the disabling mode has not been set, the output controller stands by until the disabling mode is set, and when the job is restarted with the disabling mode having been set, the output controller merges first data that is read in the reading operation before the interruption and second data that is read in the reading operation after the restart into a single file and outputs the file, the disabling mode includes an original document unit disabling mode for disabling the multi-sheet feed detection by the multi-sheet feed detection sensor until the trailing edges of the original documents pass through the multi-sheet feed detection sensor, and if the original document unit disabling mode is instructed by the instruction section, in response to detection of the passage of the trailing edges of the original documents through the multi-sheet feed detection sensor based on a detection signal detected by the transport detection sensor, the multi-sheet feed detection performed by the multi-sheet feed detection sensor is enabled.

2. The image reading apparatus according to claim 1, wherein the disabling mode includes a job unit disabling mode for disabling the multi-sheet feed detection by the multi-sheet feed detection sensor until the job is complete, wherein if the job unit disabling mode is instructed by the instruction section, in response to the job completion, the multi-sheet feed detection by the multi-sheet feed detection sensor is enabled.

3. The image reading apparatus according to claim 2, further comprising:

a placement section on which the original documents to be read are mounted; *and* a placement detection sensor configured to detect the original documents mounted on the placement section[; and], *wherein*

[a]*the* transport detection sensor *is further* configured to detect the original documents mounted on the placement section and transported by the transport section,

[wherein]from the job interruption to the job restart, the disabling mode set in accordance with the instruction from the instruction section is maintained regardless of the detection results of the placement detection sensor and the transport detection sensor.

4. The image reading apparatus according to claim 2, wherein the disabling mode includes a disable maintaining mode for maintaining the state in which the multi-sheet feed detection by the multi-sheet feed detection sensor is disabled until the power supply is switched off.

5. The image reading apparatus according to claim 2, wherein the instruction section issues an instruction for starting the job, and the interrupted job is restarted in accordance with the start instruction from the instruction section.

6. The image reading apparatus according to claim 1, further comprising:

a placement section on which the original documents to be read are mounted; and a placement detection sensor configured to detect the original documents mounted on the placement section, wherein the transport detection sensor is further configured to detect the original documents mounted on the placement section and transported by the transport section, and from the job interruption to the job restart, the disabling mode set in accordance with the instruction from the instruction section is maintained regardless of the detection results of the placement detection sensor and the transport detection sensor.

7. The image reading apparatus according to claim 1, wherein the disabling mode includes a disable maintaining mode for maintaining the state in which the multi-sheet feed detection by the multi-sheet feed detection sensor is disabled until the power supply is switched off.

8. The image reading apparatus according to claim 1, wherein the instruction section issues an instruction for starting the job, and the interrupted job is restarted in accordance with the start instruction from the instruction section.

*9. An image reading apparatus comprising:*

*a transport section configured to transport original documents along a transport path;*

*a reading section configured to read images of the original documents transported by the transport section;*

*an output controller configured to output data of the original documents read by the reading section;*

*a multi-sheet feed detection section configured to detect a multi-sheet feed of the original documents transported by the transport section;*

*an instruction section configured to issue an instruction to disable multi-sheet feed detection by the multi-sheet feed detection section based on an operation of the instruction section by a user; and*

*a transport detection section configured to detect the original documents transported by the transport section,*

*wherein, after a job for sequentially transporting a plurality of original documents to perform a reading operation to read images is interrupted by multi-sheet feed detection performed by the multi-sheet feed detection section, the output controller determines whether a disabling mode in which the multi-sheet feed detection is disabled in accordance with the instruction from the instruction section has been set or not,*

*when the disabling mode has not been set, the output controller stands by until the disabling mode is set, and when the job is restarted with the disabling mode having been set, the output controller outputs first data that is read in the reading operation before the interruption and second data that is read in the reading operation after the restart such that the first data and the second data can be saved as a single file,*

*the disabling mode includes an original document unit disabling mode for disabling the multi-sheet feed detection by the multi-sheet feed detection section, the multi-sheet feed detection being configured to detect a multi-sheet feed of the original documents until the trailing edges pass through the multi-sheet feed detection section, and*

*if the original document unit disabling mode is instructed by the instruction section, the multi-sheet feed detection performed by the multi-sheet feed detection section is configured to change from being disabled to being enabled after detecting that the trailing edges of the original documents pass through the multi-sheet feed detection section based on a detection signal detected by the transport detection section.*

*10. The image reading apparatus according to claim 9, wherein the disabling mode includes a disable maintaining mode for maintaining the state in which the multi-sheet feed detection by the multi-sheet feed detection section is disabled until the power supply is switched off.*

*11. The image reading apparatus according to claim 9, wherein the instruction section issues a start instruction for starting the job, and*

*the interrupted job is restarted in accordance with the start instruction from the instruction section.*

*12. The image reading apparatus according to claim 9, wherein the disabling mode includes a job unit disabling mode for disabling the multi-sheet feed detection by the multi-sheet feed detection section until the job is complete,*

*wherein if the job unit disabling mode is instructed by the instruction section, in response to the job completion, the multi-sheet feed detection by the multi-sheet feed detection section is enabled.*

*13. The image reading apparatus according to claim 9, further comprising:*

*a placement section on which the original documents to be read are mounted; and*

*a placement detection section configured to detect the original documents mounted on the placement section,*

*the transport detection section configured to detect the original documents mounted on the placement section and transported by the transport section, wherein*

*from the job interruption to the job restart, the disabling mode set in accordance with the instruction from the instruction section is maintained regardless of the detection results of the placement detection section and the transport detection section.*

*14. The image reading apparatus according to claim 9, further comprising*

*a notification section configured to notify of a selected mode,*

*wherein, when the original document unit disabling mode is selected by the user, the output controller is configured to control the notification section to notify that the original document unit disabling mode is being selected.*

*15. A method of controlling an image reading apparatus comprising:*

*transporting original documents along a transport path;*

*reading images of the transported original documents;*

*outputting data of the original documents that have been read;*

*detecting, by a multi-sheet feed detection section, a multi-sheet feed of the original documents being transported;*

*receiving an instruction to disable a multi-sheet feed detection by the multi-sheet feed detection section;*

*detecting the original documents being transported;*

*after a job for sequentially transporting a plurality of original documents to perform a reading operation to read images is interrupted by multi-sheet feed detection performed by the multi-sheet feed detection section, determining whether a disabling mode in which the multi-sheet feed detection is disabled in accordance with the instruction from the instruction section has been set or not;*

*when the disabling mode has not been set, standing by until the disabling mode is set, and when the job is restarted with the disabling mode having been set, outputting first data that is read in the reading operation before the interruption and second data that is read in the reading operation after the restart such that the first data and the second data can be saved as a single file,*

*the disabling mode includes an original document unit disabling mode for disabling the multi-sheet feed detection by the multi-sheet feed detection section that detects a multi-sheet feed of the original documents until the trailing edges pass through the multi-sheet feed detection section, and*

*if the original document unit disabling mode is instructed by the instruction, allowing the multi-sheet feed detection performed by the multi-sheet feed detection section to be changed from being disabled to being enabled after detecting that the trailing edges of the original documents pass through the multi-sheet feed detection section based on a detection signal of the original documents.*

*16. The method of controlling an image reading apparatus according to claim 15, wherein the disabling mode includes a disable maintaining mode for maintaining the state in which the multi-sheet feed detection is disabled until the power supply is switched off.*

*17. The method of controlling an image reading apparatus according to claim 15, wherein the receiving of the instruction includes receiving a start instruction for starting the job, and*

*the interrupted job is restarted in accordance with the start instruction.*

*18. The method of controlling an image reading apparatus according to claim 15, wherein the disabling mode*

*includes a job unit disabling mode for disabling the multi-sheet feed detection by the multi-sheet feed detection section until the job is complete,*

*wherein if the job unit disabling mode is instructed by the instruction, in response to the job completion, the multi-sheet feed detection by the multi-sheet feed detection section is enabled.*

*19. The method of controlling an image reading apparatus according to claim 15, further comprising:*

*detecting the original documents mounted on a placement section, wherein*

*from the job interruption to the job restart, the disabling mode set in accordance with the instruction is maintained regardless of the detection result of the original documents being placed on the placement section and the detection result of the original documents being transported.*

* * * * *